United States Patent [19]
Plat et al.

[11] 3,891,640
[45] June 24, 1975

[54] APOVINCAMINIC ACID AMINES AND ACID ADDITION SALTS THEREOF

[75] Inventors: Michel Marie René Plat; Monique Plat, nee Berry, both of Antony; Jean Cahn, Montrouge; Pierre Georges Christian Tisseyre, Alencon, all of France

[73] Assignee: Synthelabo, France

[22] Filed: Mar. 22, 1973

[21] Appl. No.: 343,681

[30] Foreign Application Priority Data
Mar. 22, 1972 France .............................. 72.09951

[52] U.S. Cl. ............ 260/247.5 FP; 260/243 B; 260/268 PC; 260/293.53; 424/248; 424/267
[51] Int. Cl. ............................................ C07d 57/06
[58] Field of Search ............... 260/293.53, 247.5 FP

[56] References Cited
UNITED STATES PATENTS
3,755,333   8/1973   Szantay et al ................. 260/293.53

OTHER PUBLICATIONS
Chem. Abstracts 60: P14558d (1964).

*Primary Examiner*—G. Thomas Todd
*Attorney, Agent, or Firm*—Armstrong, Nikaido & Wegner

[57] ABSTRACT

The invention provides novel heterocyclic amides of apovincaminic acid, particularly morpholinylapovincamide and piperidinyl-apovincamide, and acid addition salts thereof which are useful in treating cardiovascular disturbances.

2 Claims, No Drawings

APOVINCAMINIC ACID AMINES AND ACID ADDITION SALTS THEREOF

This invention relates to new amides of apovincaminic acid and acid addition salts from said amides and pharmaceutically acceptable acids; it also relates to the production of said amides and salts, and to pharmaceutical compositions containing the same.

It is an object of this invention to provide new apovincaminic acid derivatives useful for veterinary and human therapeutics, in particular cardiovascular therapeutics.

Apovincaminic acid was described for the first time by J. MOKRY et al. (Chemische Zvesti, 1963, 17, page 41); the N-unsubstituted amide and N-monoalkyl-and N,N-dialkyl-amides thereof are also known (French Patent Application No. 69-40188 in the name of RICHTER GEDEONVEGYESZETI GYAR R.T.).

According to this invention we provide apovincaminic acid amides of the general formula

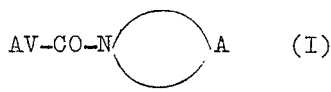

in which

AV-CO stands for the following apovincaminic acid radical

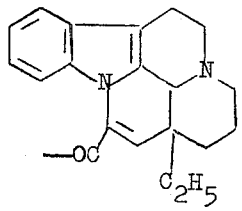

and

represents a heterocyclic radical, A being a saturated alkylene chain having from 4 to 6 carbon atoms, which may be interrupted by a heteroatom such as >O, or >S, or an amino group >NH or >NR, R standing for an alkyl radical having 1 to 6 carbon atoms.

Examples of amines capable of providing a suitable radical

are piperidine, morpholine, thiomorpholine, pyrrolidine, perhydroazepine, piperazine and N-methyl-piperazine.

Additionally the alkylene chain A may bear one or more lower alkyl substituents, i.e. alkyl substituents having 1 to 6 carbon atoms, in any position or positions.

We further provide acid addition salts as are obtainable from the amides of formula I and pharmaceutically acceptable acids; suitable pharmaceutically acceptable acids are hydrochloric acid, citric acid, tartric acid and malic acid.

Our new amides and salts thereof may be produced, according to this invention, by the use of general methods known for the synthesis of similar compounds.

Thus for example apovincaminic acid or an alkali metal salt thereof may be converted to an halide of said acid, for example by means of an oxalyl halide, more particularly the oxalyl chloride, or by means of a thionyl halide, or any other conventional method. The reaction is preferably carried out in a non-polar solvent, in particular an aromatic hydrocarbon such as benzene or toluene, and at a temperature of about 0°C. However an acid acceptor such as a tertiary organic base, for example pyridine, may be added to the non-polar solvent.

The acid chloride may be converted to the desired amide by reaction at room temperature with the corresponding heterocyclic amine, in a neutral or basic, non-polar solvent medium; an acid acceptor such as a tertiary organic base may be added.

In a modification of the above process apovincaminic acid is converted to another functional derivative thereof, for example an alkyl ester, which is then reacted with the heterocyclic amine to produce the desired amide.

The following Examples whch are not limiting will illustrate how our new compounds may be prepared.

EXAMPLE 1

Morpholinyl apovincamide

Oxalyl chloride (20 ml) was added to apovincaminic acid 36 g) suspended in anhydrous benzene (1 litre), the temperature of the mixture being maintained at about 0°C. The mixture was stirred for 8 hours then distilled to dryness under reduced pressure to remove the solvent. The residue was taken up in benzene (1litre) then freshly distilled morpholine (20 ml) was added. The mixture was left for 24 hours, then unreacted apovincaminic acid was filtered off.

The filtrate was evaporated to dryness, and the residue taken up in the minimum amount of methylene chloride was adsorbed on alumina (50 g). The solvent was removed in vacuo. The adsorbate placed in a column of alumina mounted in ether was diluted with ether then with methanol. The ether fraction was concentrated, and the desired amide crystallized from a mixture of ether and hexane. M.P.155°–156°C.

U.V. spectrum: in neutral ethanol: max$\lambda$ m$\mu$ 225-260-313; chromatophore proximate to that of apovincamine.

I.R. spectrum : amide band at 1650 cm$^{-1}$.

Analysis $C_{24}H_{29}N_3O_2$ (391.5)
| | C | H | N | O |
|---|---|---|---|---|
| Calc. % | 73.63 | 7.46 | 10.73 | 8.17 |
| TR. % | 73.83 | 7.58 | 10.36 | 8.50 |

The malate of the morpholinyl apovincamide is prepared as follows:

to the morpholinyl-apovincamide in suspension in methanol is added an equimolecular amount of malic acid. The solvent is evaporated and the hemimalate crystallizes. Soluble in water. M.P. 131°–133°C.

EXAMPLE 2

Piperidinyl apovincamide

Sodium salt of apovincaminic acid (40 g) was suspended in an anhydrous mixture (1 litre) of benzene and pyridine (98:2). The suspension was cooled in an ice bath and an equivalent (16 g) of oxalyl chloride was added. The whole was maintained for 6 hours under magnetic agitation, then after successive additions of mono-sodium carbonate (6 g) and freshly rectified piperidine (13 ml), stirring was proceeded with for an hour and the mixture was left standing overnight. The insoluble residue was filtered off and washed with benzene; the combined filtrates were evaporated to dryness under reduced pressure and the residue (14 g) was purified by filtration on alumina in ether.

The amide thus obtained was crystallized from ether; it formed fine needles; M.P. 178°–180°C.

U.V. spectrum: max.$\lambda$ m$\mu$ (log$\epsilon$), 225 (4.44), 260 (4.28), 302 (3.96), 313 (4.09), chromophore proximate to that of apovincamine.

I.R. spectrum : amide band at 1640 cm$^{-1}$.

Analysis $C_{25}H_{31}N_3O$ (389.5).

| | C 77.01 | H 8.02 | N 10.79 | O 4.18 |
|---|---|---|---|---|
| Calc. % | C 77.01 | H 8.02 | N 10.79 | O 4.18 |
| Tr. % | 77.02 | 8.08 | 10.84 | 4.24 |

Prepared in the same manner as in Example 1 the piperidinyl apovincamine hemimalate has a melting point of 130°C.

Our compounds were subjected to a series of pharmacological tests which brought interesting properties to light, particularly in the cardiovascular field.

The results obtained with the compounds of Examples 1 and 2 will now be set forth.

Acute toxicity a. The LD 50 was determined in mice of both sexes having an average weight of 20 g ±2 g. Said LD 50 was calculated according to the method of Miller and Tainter (Proc.Soc.Exp.Biol.Med., 1944, 57, p.261).

The compounds were administered intravenously in the form of solutions in a 30% dilution of propylene-glycol in water. The results are tabulated below.

| Compound | LD 50 (i.v.) |
|---|---|
| Morpholinyl-apovincamide | 40 ± 7.5 mg/kg |
| Piperidinyl-apovincamide | 69 ± 5.5 mg/kg | b. In a second step the 50% lethal doses of morphinyl-apovincamide and piperidinyl-apovincamide administered intravenously to mice of Swiss strain in the form of the soluble malates thereof in isotonic sodium chloride aqueous solution were determined with a view to doing away with the proper toxicity of the propylene-glycol employed in the experiment a) above.

Determined according to Litchfield and Wilcoxon (J.Pharmacol.Exp. Therap., 1949,96, p.99–113), the LD 50 we found were the following:

Morpholinyl-apovincamide (malate): 103 (fiducial limits 95%: 95–111) mg/kg

Piperidinyl-apovincamide (malate): 97 (fiducial limits 95%: 88–107) mg/kg

These values correspond to:

Morpholinyl-apovincamide (base): 76.7 (70.8–88.7) mg/kg

Piperidinyl-apovincamide (base): 72.2 (65.5–79.6) mg/kg c. In a third step the lethal doses 50% of morpholinyl-apovincamide and piperidinyl-apovincamide administered through the oral route as solutions thereof in distilled water to Swiss mice were determined.

Calculated according to Litchfield and Wilcoxon, the LD 50 of the malates were as follows:

Morpholinyl-apovincamide (malate): 175(140–219) mg/kg

Piperidinyl-apovincamide (malate): 350(312.5–392) mg/kg

The above values correspond to:

Morpholinyl-apovincamide (base): 130.4(104.3–163.1) mg/kg

Piperidinyl-apovincamide (base): 260.4(232.5–291.6) mg/kg

Coronaro-dilating action. Activity on rabbit isolated heart 1. Beating heart

We employed the method of Langendorff (Arch. fur die gesammte Physiologie des Menschen und der Tiere, 1895, 61, p. 291–338) with rabbits of the strain "Fauve de Bourgogne" weighing 1.5 kg as an average.

Morpholinyl-apovincamide

When perfusing the heart for 3 minutes with an aqueous solution of the compound at a concentration of $5.10^{-5}$ g/ml, we did not find any noticeable action on the rhythm but we recorded an average increase of the blood throughput in the coronaries of the order of 45% and a decrease of the contractions of the order of 60%.

Piperidinyl-apovincamide

A perfusion for 3 minutes of an aqueous solution containing $1 \times 10^{-6}$ g/ml of this compound caused an increase of 30% of the coronary throughput. Upon making one injection of the compound we observed a positive inotropic action already with an injected amount of 50 $\mu$g and a decrease of the blood throughput as well as a considerable strenghtening of the contractile heart force already with an injected amount of 100 $\mu$g.

2. Fribrillating heart

We worked as described by Charlier (Coronary Vasodilators, 1961, 10, p.17).

With piperidinyl-apovincamide we found as an average a blood throughput increase of 30% for a concentration of $1 \times 10^{-6}$ g/ml. The spasm caused by injecting 0.4 g of vasopressine was but slightly inhibited at the same concentration.

Action on blood pressure and breathing

We made experiments on dogs with morpholinyl-apovincamide and on cats with piperidinyl-apovincamide. The animals were anesthesized.

Morpholinyl-apovincamide

With 2 mg/kg i.v. we noted a deep carotidian central hypotension followed with a reflex hypertension. The peripheral pressure was altered in a similar fashion. The respiratory rhythm and amplitude were not altered and the heart rhythm was but little lowered.

Piperidyl-apovincamide

In a dosis of 6.9 mg/kg i.v. a rapid and deep hypotension accompanied with a small bradycardia was noted. The pressing effects of epinephrine and no-epinephrine were diminished and sometimes reversed. The hypertension produced by occluding carotides was also inhibited.

Activity of morpholinyl-apovincamide (compound I) and piperidinyl-apovincamide (compound II) on evolution of an experimental cerebral oedema in rabbit.

For each one of the compounds I and II, the experiment was carried out in 8 rabbits having fasted for 18 hours and receiving 5 mg/kg of the experimented substance via the intraduodenal route.

A unilateral cerebral oedema was caused by punching out a bone piece having a diameter of about 7 to 10 mm from the brain-pan in the temporo-occipital area, followed with a sudden opening of dura mater and arachnoid. As a result of the production of the oedema severe perturbations in the electroencephalogram of the damaged hemisphere without any effect on the sound hemisphere occurred. The perturbations consisted in the appearance of slow waves and were accompanied with a degradation of the theta awakening rhythm.

An hour after the dura mater was opened the experimented compounds were administered. The electroencephalogram was followed up during the 72 hours consecutive to the opening of the dura mater. Parallelly the residual cortical reactivity of the damaged hemisphere was studied by examining the cortical awakening reactions caused by a nocireceptive stimulation.

A lot of 8 control rabbits was also employed.

The results were as follows:

a. The compounds I and II immediately and continuously reduced the electroencephalographic consequences of the unilateral cerebral oedema in rabbit.

The ratio (theta rhythm/slow waves) which was much lowered by the oedema tended to resume a normal value as a consequence of the treatment while nothing similar was observed with control rabbits.

The beneficial effect ended 48 hours after the compounds I and II were administered.

b. As regards residual cortical reactivity it was also improved immediatly after the administration of compound I or II and remained very small in control animals.

Activity of compounds I and II on backward amnesia of hypoxic origin in rat

Pubescent male Wistar rats were subjected to a training in one run (passive reaction of avoidance) according to Buresova et al. (Pharmacology of conditioning, learning and retention, 1965, Pergamon Press Edit., p.351-356.).

Immediately after training a memory deficit was created in the rate by a nitrogen hypoxia (sojourn in a mixture of oxygen and nitrogen having a 8% oxygen content gradually lowered to 3.5% with maintenance of the rats at this hypoxia level for 10 minutes). A retention test was then effected 24 hours after the training. The animals were divided into 10 lots of 15 rats fasted 18 hours before the experiment (except for 20% glucose water given at will).

The lots were divided into:

8 lots which received orally 60 minutes before training:

(lots 1 to 4): 1,2, 4 and 8 mg of compound I respectively, (lots 5 to 8): 1,2,4 and 8 mg of compound II respectively, 1 reference lot:

(lot 9): non-treated lot subject solely to training and memory retention test, 1 control lot:

(lot 10): subjected to the same tests as treated lots except for the treatment.

The results were as follows:

85% of the animals of lot No. 9 shewed a good memory retention; on the contrary the animals of lot No. 10 forgot their training; finally the animals of lots 1 to 8 shewed a memory retention whith increased with the dosis, the dosis of 8 mg/kg resulting in a behaviour identical to that of animals of lot No. 9 with both of said compounds.

In view of the above results the compounds of our invention may be employed in human and veterinary medicine as coronarodilators and peripheral and cerebral vasodilators.

They are preferably although not limitingly administered through the oral route or the endorectal route.

The compounds may be presented for oral administration in any form appropriate to this route, in particular as tablets which may be coated or turned into dragees, capsules, gelules or the like, the active substance being associated with the usual excipients for this form of medicaments. The content of active substance may be between 1 and 20 mg per dosage unit.

In the case of the endorectal route the content may be from 1 to 20 mg, the active substance being associated with any known excipient for suppositories.

The new compounds may be administered at average daily doses of 5 mg to 50 mg orally or endorectally.

What we claim is:

1. A compound of the formula and the non-toxic addition salts thereof.

2. A compound of the formula and the non-toxic acid addition salts thereof.

* * * * *